United States Patent
Kwak (10) Patent No.: US 7,519,392 B2
(45) Date of Patent: Apr. 14, 2009

(54) INTEGRATED WIRELESS LOCAL LOOP SYSTEM

(75) Inventor: Woo Young Kwak, Kyonggi-do (KR)

(73) Assignee: LG Electronics, Inc., Seoul (KR)

( * ) Notice: Subject to any disclaimer, the term of this patent is extended or adjusted under 35 U.S.C. 154(b) by 468 days.

(21) Appl. No.: 10/165,744

(22) Filed: Jun. 7, 2002

(65) Prior Publication Data

US 2003/0148788 A1    Aug. 7, 2003

(30) Foreign Application Priority Data

Feb. 1, 2002    (KR) .................................. 2002-5841

(51) Int. Cl.
*H04M 1/00*    (2006.01)
(52) U.S. Cl. .................................... 455/554.2; 455/557
(58) Field of Classification Search ............... 455/3.05, 455/425, 426.2, 566, 20, 21, 569.1, 311, 455/573, 556.1, 575.1, 127.4, 346, 414.4, 455/557, 553.1, 189.1, 190.1, 463, 466, 404, 455/277, 462, 465, 422, 90.3, 432.1, 436, 455/439, 442, 426.1, 422.1, 43, 554.2; 710/300; 370/277
See application file for complete search history.

(56) References Cited

U.S. PATENT DOCUMENTS

| 6,058,104 | A | * | 5/2000 | Snelling et al. ............. 370/277 |
| 6,211,649 | B1 |   | 4/2001 | Matsuda |
| 6,255,800 | B1 | * | 7/2001 | Bork ........................... 320/115 |
| 6,308,062 | B1 | * | 10/2001 | Chien et al. ................. 455/420 |
| 6,625,472 | B1 | * | 9/2003 | Farazmandnia et al. ..... 455/557 |
| 2001/0021659 | A1 | * | 9/2001 | Okamura ..................... 455/557 |
| 2002/0025778 | A1 | * | 2/2002 | Lee ............................. 455/3.05 |
| 2002/0038432 | A1 | * | 3/2002 | Hsu ............................. 713/300 |
| 2002/0082047 | A1 | * | 6/2002 | Souissi et al. ............... 455/557 |
| 2002/0094776 | A1 | * | 7/2002 | Pulver ........................ 455/3.05 |
| 2002/0119800 | A1 | * | 8/2002 | Jaggers et al. .............. 455/550 |
| 2002/0123326 | A1 | * | 9/2002 | Iyengar et al. .............. 455/412 |

FOREIGN PATENT DOCUMENTS

| CA | 2 223 698 |   | 8/1999 |
| JP | 10/165246 | * | 3/1997 |
| JP | 2000-139032 | * | 5/2000 |
| JP | 2001-142837 |   | 5/2001 |
| KR | 10-2001-0103454 |   | 11/2001 |

* cited by examiner

*Primary Examiner*—Tu X Nguyen
(74) *Attorney, Agent, or Firm*—Lee, Hong, Degerman, Kang & Waimey

(57) ABSTRACT

One piece type or integrated wireless local loop (WLL) terminal has a speaker, a microphone, and a built-in or integrated USB (Universal Serial Bus) and USB driver in the terminal. The WLL terminal is capable of being used with a charger that has connectors for connecting the USB line driver and the USB of the terminal with an external device, such as a personal computer.

15 Claims, 6 Drawing Sheets

INTEGRATED WIRELESS LOCAL LOOP SYSTEM

CROSS REFERENCE TO RELATED ART

This application claims the benefit of the Korean Application No. P2002-5841 filed on Feb. 1, 2002, which is hereby incorporated by reference.

BACKGROUND OF THE INVENTION

1. Field of the Invention

The present invention relates to a wireless local loop system, and more particularly, to an integrated wireless local loop terminal.

2. Background of the Related Art

In general, the wireless local loop (hereafter called as 'WLL') system provides a wireless subscriber line to connect between a local switching center and home or office, not by wire, but by radio telecommunication, for providing voice, facsimile, and data communication services.

The WLL is called as RITL (Radio In the Loop), FRA (Fixed Radio Access), FWA (Fixed Wireless Access), or FCS (Fixed Cellular System) in some countries, and is one of technical fields that draws attention of communication providers. The WLL system has been devised by AT&T Bell Laboratory in early 1970 for a sparsely populated region, such as fishing and agrarian villages, for reducing installation cost.

However, because securing radio frequencies was not easy, and costs for manufacturing and installation of antennas and radio transmitters/receivers were excessive, the WLL system could not be put into practical use. However, as semiconductor and electronic communication technologies are developed rapidly in 1990s, the problems, such as frequency efficiency, radio channel quality, and installation cost per subscriber, are solved so that many manufacturers can now produce economical products.

The communication providers pay attention to the WLL system because of the following features of the WLL system.

First, installation of subscriber lines is easier than a current subscriber line network in which the connection from a local switchboard to a subscriber home is made by a line. Also, an installation time period required until starting of service is reduced.

Second, the WLL system has a merit in view of endurance of service because the WLL system can be used as an emergency subscriber line in case of damage to the current subscriber line network caused by natural disaster, or the like.

Third, the WLL system can provide flexible services with respect to a variety of service requirements, such as POTS (Plain Old Telephone Service), data service, and ISDN.

Fourth, installation cost is fixed regardless of distance, such that an initial investment cost is reduced, and recuperation of the investment is faster.

Fifth, a WLL system network can be expanded quickly corresponding to an increased subscriber demand.

The WLL having the foregoing features is considered to be the most potent method for construction of a subscriber network quickly by a telephone service provider, or a communication service provider, and further considered as a fundamental communication structure of a developing country that has a POTS.

In the meantime, although the WLL is similar to a mobile communication network in view that radio channels are used as communication media, the WLL has an advantage in that the WLL has an electronic wave environment substantially robust than the electronic wave environment of the mobile communication network because the WLL has no mobility. Besides, the WLL had the following features in comparison to the mobile communication network.

Although the environment of the mobile communication network has a wave path loss in a range of 40 dB/decade because the environment is a non-line-of-sight environment because of blocking, reflection, and refraction of a straight wave by surrounding buildings as the antenna is located at a place lower than the surrounding buildings, the environment of the WLL has a wave path loss as low as 20 dB/decade because the environment is a line-of-sight environment because the antenna is located at a rooftop and a mobility of the antenna is limited, permitting to serve a larger area by using the same power.

Because the electronic wave environment of the WLL is a stationary communication of a point to point type, the electronic wave environment of the WLL has substantially less fading caused by multiple paths than the electronic wave environment of a mobile communication network that has a point to mobile station type.

The WLL requires no hand-over as the WLL is a stationary radio communication network. Therefore, the WLL requires no reserved radio channels for the hand-off that is required in the mobile communication network. These reserved radio channels may be used for general calls permitting to obtain effects of an increased radio channel efficiency and an increased subscriber capacity. The radio link between a building and a base station can be constructed in a direction for reducing interference to a particular subscriber, and because there is no change of the radio link unless the subscribers are substantially increased or a cell is divided, a design of the WLL is substantially simpler than a mobile communication network.

Moreover, the stationary radio communication of the WLL permits the use of directional antenna on forward/backward links for reducing an identical channel interference to respective subscribers, that in turn permits to reduce a distance of frequency re-use. The reduction of frequency re-use distance brings about an increased subscriber capacity per unit area.

Basically, the WLL is provided with a telephone set, an NIU (Network Interface Unit) that makes a wireless communication between the telephone set and a local switching center possible, a base station, a base station controller, a base station managing device, and the like.

The NIU is located at the final stage of network elements for carrying out functions of transmission/reception of a radio signal, modulation/demodulation of a radio channel, voice compression/decompression, and access to a PSTN terminal. There may be various forms of terminals depending on applied technologies. For example, a terminal with built-in RF function, a terminal with separate RF function and a handset, and the like, and a single line, or multiple line may be provided.

The base station is located between the NIU and the base station controller, and connected to the NWJ by radio signal, and to the base station controller by line, for transmission/reception of a radio signal, power control, modulation/demodulation of a channel, protocol transform for signal transmission/reception with the NIU and the base station controller. The base station is provided with an antenna transmitter/receiver, a power amplifier, channel cards, and hardware for interface with the base station controller.

In making a radio access with the NTU, the base station has a limitation of a capable cell radius caused by limitations in the electronic wave environment and a radio power, to require the base station controller for effective access to a wireless section and a wired section. The base station controller is located between the local switching center and the base station for connecting the local switching center and the base station and managing the base station. The base station controller is connected to respective base stations by wire mostly, and for managing radio resources, transcoding, base station managing, and a function of base station and switchboard match.

The base station managing device performs managing and maintenance of entire equipments in the WLL, such as network system managing, performance managing, data processing, software management, security management, and the like.

The telephone set and the NIU correspond to a WLL terminal of the present invention. There are a separate type WLL terminal and one piece type WLL terminal in the foregoing WLL terminal depending on connection between the telephone set and the NIU.

That is, the separate type or modular type WLL terminal has a stationary telephone set and a separate NIU connected to the terminal by cable and preferably used by wire for purchase of, not the telephone set, but the NIU only, when a subscriber having the stationary telephone set connected to an existing wire network intends to subscribe to the WLL.

The one piece type integrated WLL terminal has a telephone set and the NIU integrated as one unit and preferably used by a subscriber who has no stationary telephone set connected to an existing wire network.

Figure 1:
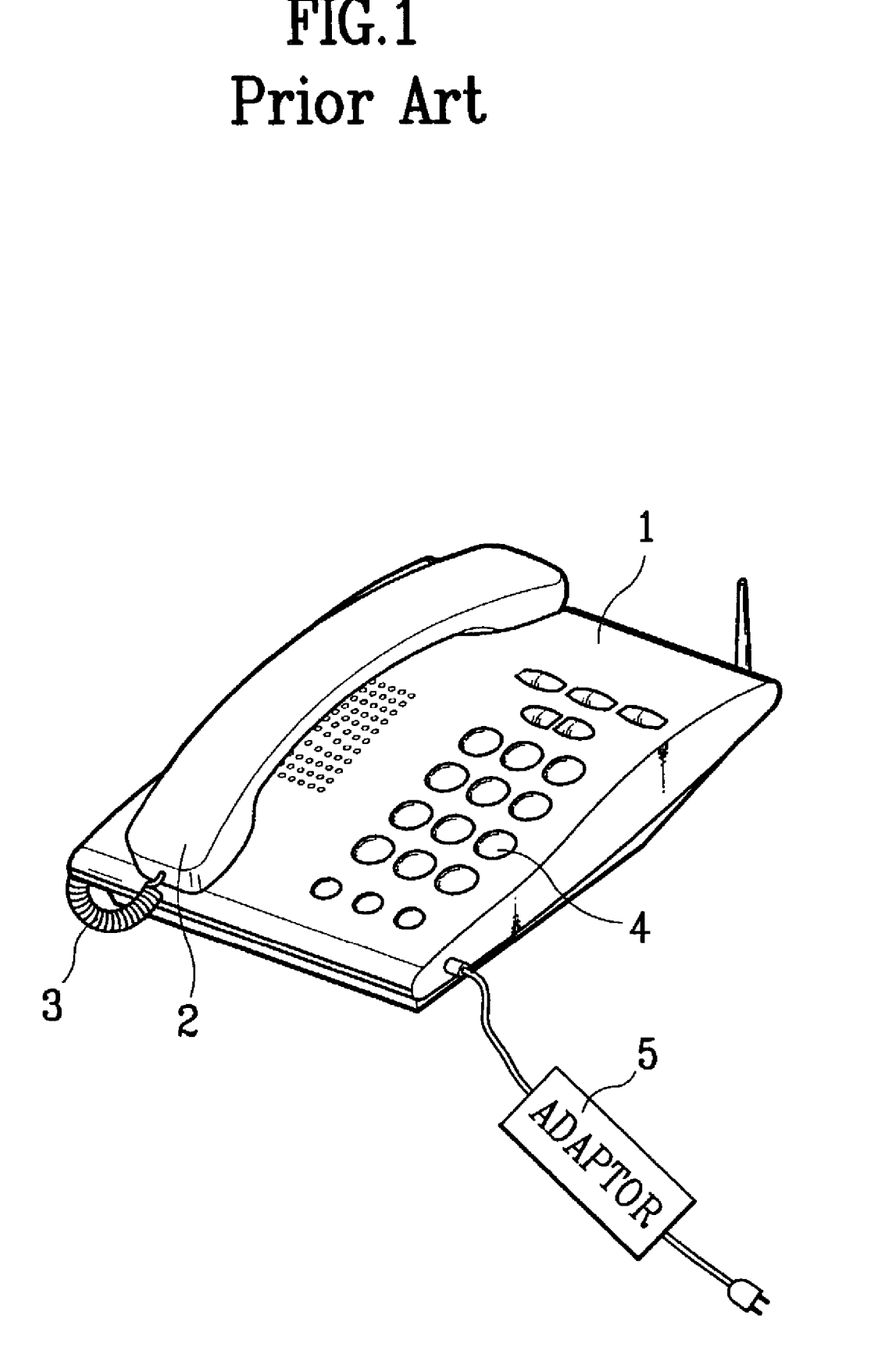
FIG. 1 illustrates a perspective view of a related art WLL terminal.

A related art one piece type WLL terminal will be explained. FIG. 1A illustrates an exemplary view of the related art WLL terminal, and FIG. 1B illustrates a block diagram of the related art WLL terminal.

Alike a general wire telephone set, the related art WLL terminal is provided with a body 1 having a telephone unit and the NM built therein, a handset 2 separated from the body 1, and a coil line 3 connected between the handset 2 and the body 1, for transmission/reception of a signal as a hook switch is switched on/off following putting down the handset 2 on the body 1, or holding up the handset 2 from the body 1.

If the user intends to make a call, the user holds up the handset 14 to switch on the hook switch, and dials a telephone number on the key pad 19, for assignment of a channel to the base station, to make a call available by the method explained before. Or the WLL system may be connected to an external instrument (computer, facsimile, or the like) through the data interface part 17 for making communication.

However, the related art WLL terminal has the following problems.

First, since the related art WLL terminal is required to be stationary for receiving power through the AC adapter, the related art WLL terminal is not convenient to use.

Second, transporting of the WLL terminal is difficult, because the WLL terminal has a 2-piece structure of separated handset and body, bulky, and uses a utility power.

Third, in the case of communication with the external instrument (a computer, or a facsimile) through the data interfacing part by connecting the WLL terminal thereto, most of the data interfacing parts have been RS232C (Recommended Standard 232 Revision C) which transmit data in series. However, the RS232C has a slow transmission rate, requires many pins for two transmission and reception lines, five control lines, and one earth line, and needs a separate line driver module for compensating difference of signal levels of a PC signal level and a WLL terminal signal level when the PC is connected to the WLL terminal.

SUMMARY OF THE INVENTION

Accordingly, the present invention is directed to a piece type wireless local loop terminal that substantially obviates one or more of the problems due to limitations and disadvantages of the related art.

An object of the present invention is to provide a piece type wireless local loop terminal having integrated body and a handset with built-in USB (Universal Serial Bus) and a USB line driver.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the one piece type wireless local loop (WLL) terminal includes a body including a handset having a speaker and a microphone, a USB for making communication with a PC, and a USB line driver, built in the body.

In another aspect of the present invention, there is provided a piece type WLL terminal including an MSM for decoding a signal from a base station, to produce an information data, coding an information data intended to transmit, converting the coded information data into a digital baseband signal, and providing the digital baseband signal to the base station, and a USB and a USB line driver fitted to the MSM for making communication with an external PC.

In further aspect of the present invention, there is provided a piece type WLL terminal including a RF transmission/reception part for receiving a RF signal through an antenna, producing an IF (Intermediate Frequency) signal, converting the IF signal into a digital baseband signal, and providing the digital baseband signal to an MSM (Mobile System Modem), and converting a digital baseband signal received from the MSM into an analog signal and an IF signal, converting the IF signal into a desired RF signal intended to transmit, and providing the RF signal to the base station through the antenna, the MSM for decoding the digital baseband signal from the RF transmission/reception part to produce an information data, coding an information data intended to transmit, converting the coded information data into a digital baseband signal, and providing the digital baseband signal to the RF transmission/reception part, a CODEC for coding an analog voice signal from the microphone into a digital voice signal, and providing the digital voice signal to the MSM, and decoding a digital voice signal from the MSM into an analog voice signal and adjusting levels of respective voice signals, a speaker for presenting the analog voice signal from the CODEC, a microphone for providing the analog voice signal to the CODEC, a USB built in the MSM for making fast communication with an external PC, a USB line driver for driving at least line so that the USB and the external PC make communication through a communication pin connector, a memory for storing a main program for driving the MSM, and a data related to user services, and a power supplying part having a charge battery for supplying power to respective parts.

The one piece type WLL terminal further includes a connector fitted to the one piece type WLL terminal for charging the charge battery of the power supplying part, and connecting the USB driver and the external PC.

The charger preferably includes a communication pin connector for connecting to the USB line driver of the one piece type WLL terminal, a power pin connector for supplying power to the battery in the power supplying part of the one piece type WLL terminal, and a USB connector connected to the communication pin connector, having a USB connector for connecting to the USB of the external PC by a USB cable.

The communication pin connector or the power pin connector preferably has two pins.

The USB connector preferably has two pins for data signal lines, and two pins for power lines.

Preferably, the two pins for data signal lines are connected to the communication pin connector, and the two pins for power lines are connected to the power pin connector.

Preferably, the charger further includes a power switching part for sensing connection of the USB cable to the USB connector and switching so that the power from the PC is supplied to the battery of the WLL terminal through the power pin connector in responsive to a result of the sensing.

The charger preferably further includes a display for indicating the USB under use.

According to an embodiment of the present invention, a WLL terminal for use with a base station comprises a modem for coding or decoding a signal transmitted to or received from the base station, respectively; a universal serial bus (USB) device connected to the modem for communicating with an external device; a first communication port to receive data from the external device; and a USB line driver connected to the USB device to process the information received through the first communication port.

According to one aspect of the invention, the WLL terminal further comprises an antenna; an RF reception part for receiving an RF signal through the antenna, producing an IF (Intermediate Frequency) signal, converting the IF signal into a digital baseband signal, and providing the digital baseband signal to the modem; a codec for decoding a modem output into an analog voice signal; and a speaker for audibly generating the analog voice signal from the codec.

According to another aspect of the invention, the WLL terminal further comprises a first power connector for receiving power from an external power source. Moreover, preferably, the first communication port has at least two connecting lines for communicating with the external device.

A WLL apparatus for use with a base station comprises a WLL terminal including: a modem for coding or decoding a signal transmitted to or received from the base station, respectively; a universal serial bus (USB) device connected to the modem for communicating with an external device; a first communication port to receive data from the external device; a USB line driver connected to the USB device to process the information received through the first communication port; and a first power connector for receiving power from an external power source. The WLL apparatus includes a detachable charger having a second power connector that couples with the first power connector and a second communication port that couples with the first communication port.

According to one aspect of the invention, the charger includes a USB connector to communicate with the external device. Preferably, the USB connector is connected to the second power connector and the second communication port of the charger. At least two communication lines of the USB connector are coupled to the second communication port and at least two power lines of the USB connectors are coupled to the second power connector.

According to another aspect of the invention, the charger includes a power switching part to sense connection of the external device to provide power from the external device to the second power connector to provide power to the WLL terminal through the first power connector. The charger may be equipped with a display indicating whether the USB device is being used.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings. The present invention relates to an integrated WLL terminal with a built-in USB, of which USB will be explained below.

The USB is developed by the USBO formed by Intel, Microsoft, Compac, IBM, NEC, DEC, and Nortel and etc., leaders of an information and communication field, who appreciate necessity of interconnection for growth of a CTI (Computer Telephony Integration) industry through standardization. The USB, not only permits connection up to 127 devices by automatic sensing without requiring re-booting or set up when a new peripheral device is connected thereto, but also supports a data transmission rate of up to 12 Mbps, and permits a power supply of 5V/500 mA. Accordingly, all the computers in the market since 1998 are provided with a USB port. As the USB is put into practical use, the USB is supported by operating systems, such as Windows 98, and devices employing the USB are increased. Accordingly, the present invention suggests fitting the USB to the WLL terminal for permitting communication from a PC with the USB to the integrated type WLL terminal.

Figure 2:
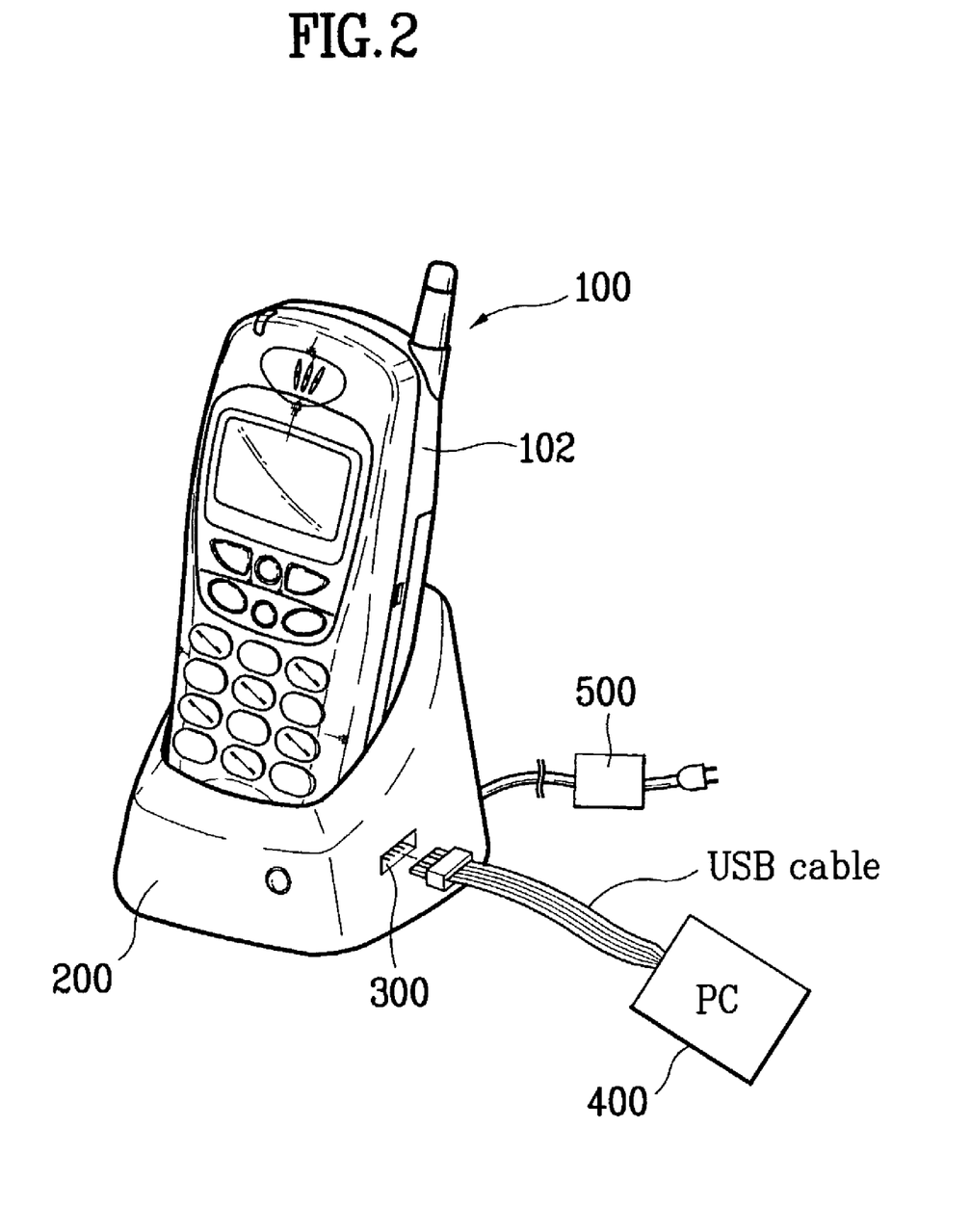
FIG. 2 illustrates a perspective view of an integrated WLL terminal in accordance with a preferred embodiment of the present invention.
Figure 3:
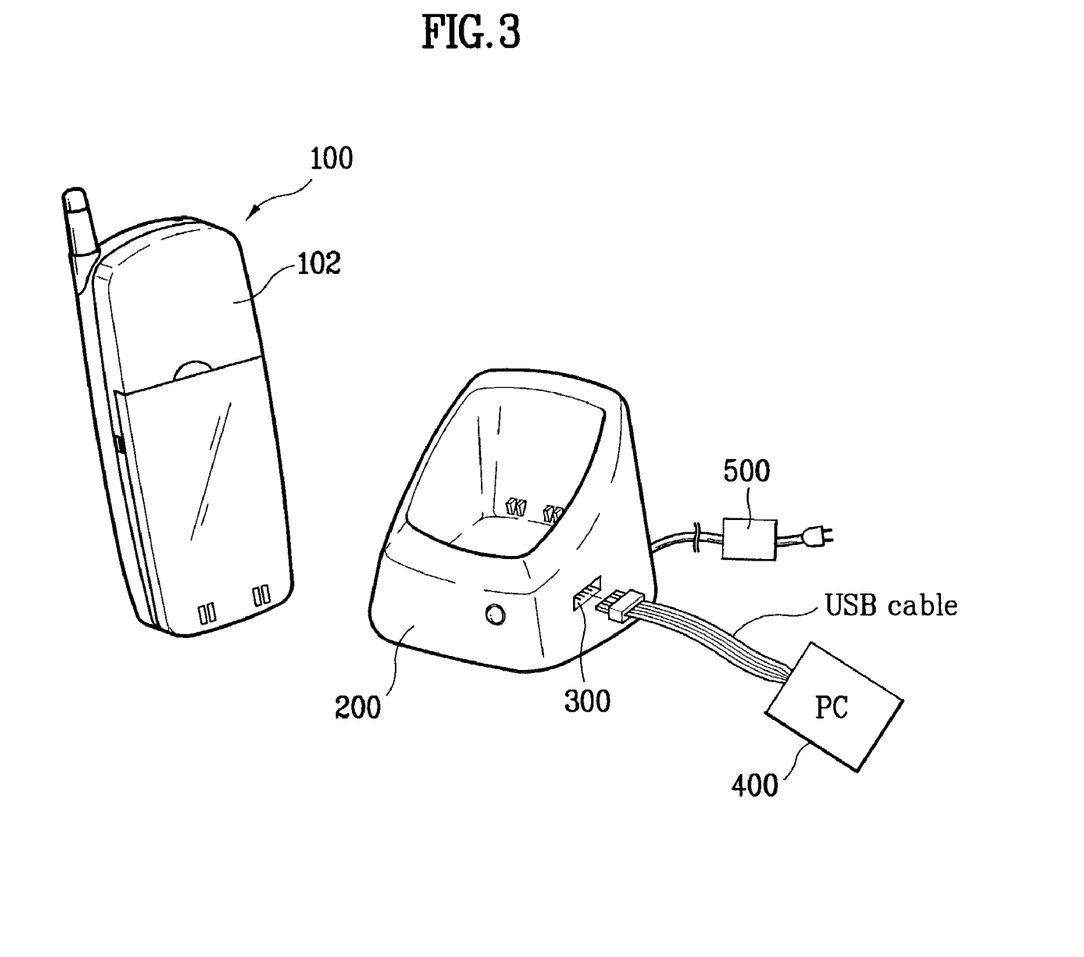
FIG. 3 illustrates a perspective view of an integrated WLL terminal, with a charger separated therefrom in accordance with a preferred embodiment of the present invention.
Figure 4:
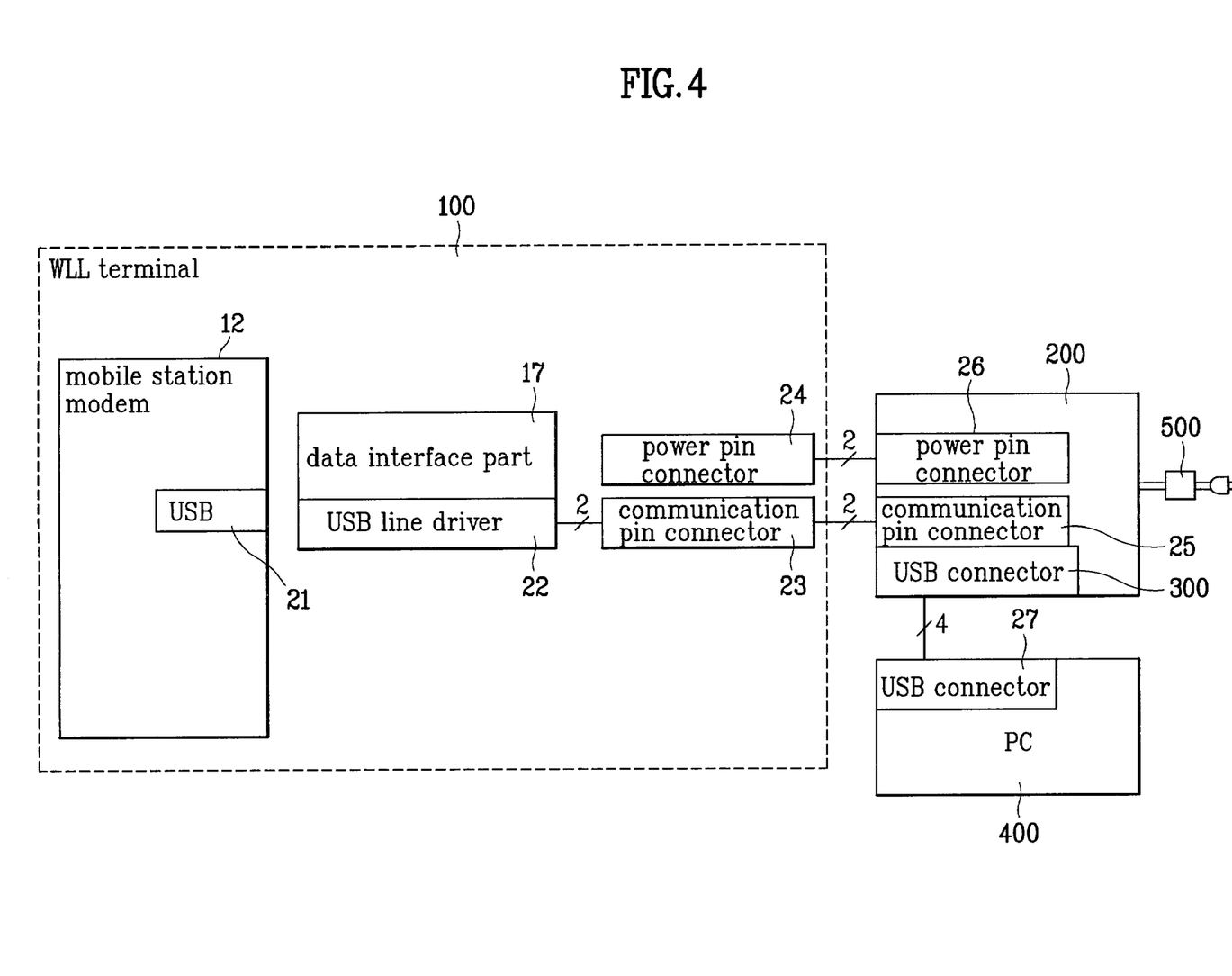
FIG. 4 illustrates a block diagram of an integrated WLL terminal and a charger in accordance with a preferred embodiment of the present invention.

FIG. 2 illustrates a perspective view of a piece type WLL terminal in accordance with a preferred embodiment of the present invention, mounted on a charger. FIG. 3 illustrates a perspective view of a piece type WLL terminal, with a charger separated therefrom in accordance with a preferred embodiment of the present invention. FIG. 4 illustrates a block diagram of a piece type WLL terminal and a charger in accordance with a preferred embodiment of the present invention.

Referring to FIG. 2, the exemplary WLL terminal 100, having a handset (speaker and a microphone), a USB, and a USB line driver built in a body 102, for receiving a signal by pressing a send button for reception, and transmitting a signal by pressing send button either after pre-dialing or post-dialing. The terminal 100 is provided with a separate charger 200 for charging a battery thereof through an external charging circuit and a USB connector 300 provided to the charger 200 for communication between a USB in a PC 400 and the one piece type WLL terminal 100.

The one piece type WLL terminal 100 and the charger 200 in accordance with a preferred embodiment of the present invention will be explained with reference to FIG. 4.

The WLL terminal 100 has the USB 21 in the Mobile Station Modem (MSM) 12, and the USB line driver 22 connected to the data interface part 17. Moreover, the WLL terminal 100 has a communication pin connector 23 (also known as a communication port) connected to the USB line driver 22 for communication with an external PC, such that, when the one piece type WLL terminal 100 is put in the charger 200, the communication pin connector 23 of the integrated WLL terminal 100 is connected to a communication pin connector 24 of the charger 200. Of course, the integrated WLL terminal 100 and the charger 200 have separate power pin connectors 24 and 26 respectively, for supplying power.

The charger 200 has the USB connector 300 fitted thereto and connected to the communication pin connector 25 for connecting the external PC 400 by a USB of the external PC 400 and a USB cable. FIG. 4 also illustrates an adapter or power supply (voltage converter) 500 for supplying power to the charger 200.

In this instance, although the USB line driver 22 may be connected to the charger 200, the number of pins for the communication pin connectors 23 and 25 between the terminal 100 and the charger 200 are increased to six because six lines are required between the MSM 12 of the WLL terminal 100 and the USB line driver 22. This is not efficient. Instead, preferably only four pins or lines are needed between the WLL terminal 100 and the charger 200 to support the USB.

Since the communication pin connector 23 and 25 and the power pin connector 24 and 26 fitted to the integrated WLL terminal 100 and the charger 200 are two pin connectors, respectively, and the USB cable has two data signal lines and two power lines, four lines in total, the USB connector 300 connected to the USB 27 of the PC 400 is a four pin connector. The pin connectors are illustrated in detail in FIG. 3.

Figure 5:
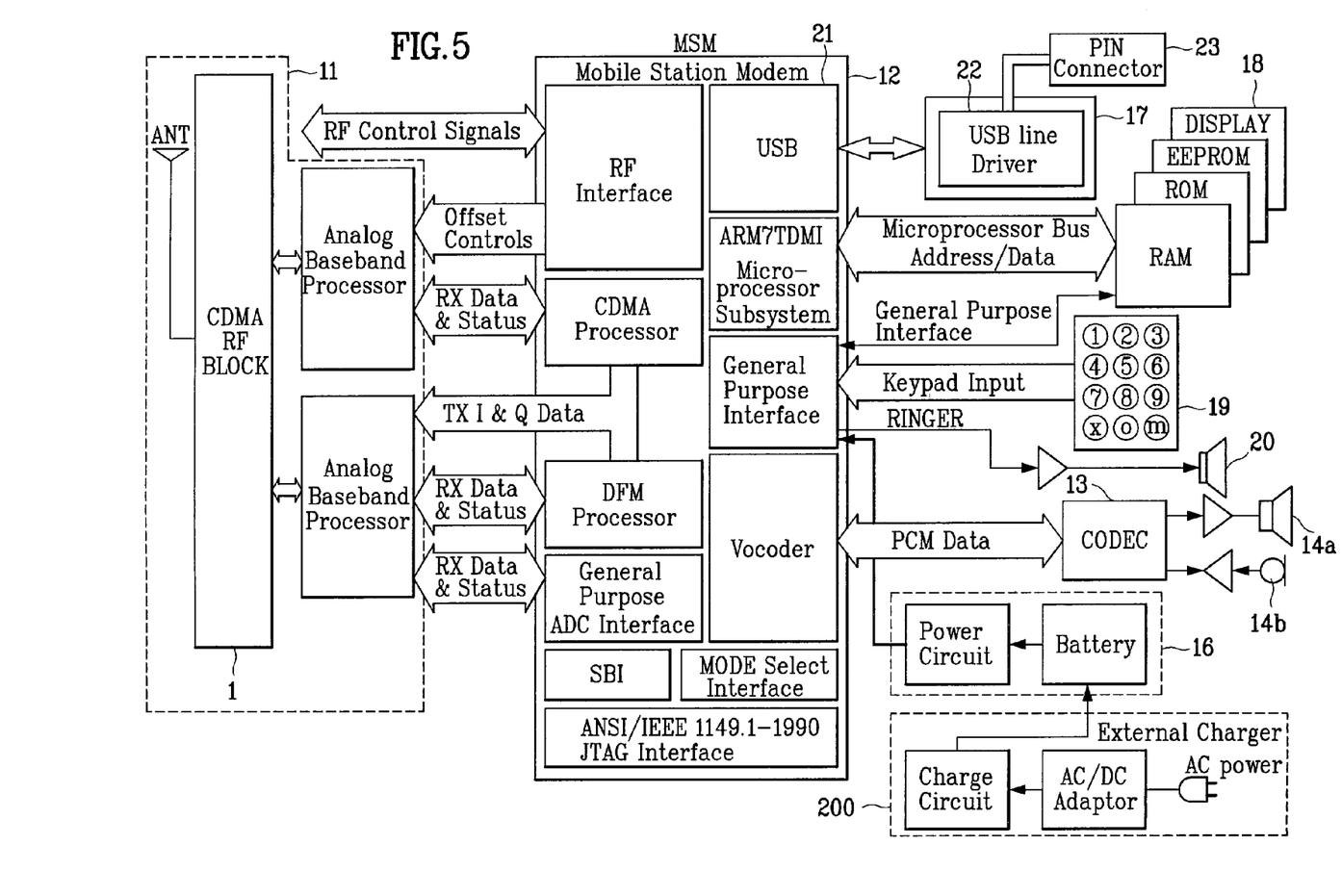
FIG. 5 illustrates a schematic circuit diagram of an integrated WLL terminal in accordance with a preferred embodiment of the present invention.

The integrated WLL terminal 100 and the charger 200 of the present invention will be explained in more detail. FIG. 5 illustrates a schematic circuit block diagram of a piece type WLL terminal in accordance with a preferred embodiment of the present invention.

Referring to FIG. 5, the WLL terminal 100 of the preferred embodiment of the present invention is an integrated remote terminal including a RF transmission/reception part 11 for receiving a RF signal through an antenna, producing an IF (Intermediate Frequency) signal from the RF signal, converting the IF signal into a digital baseband signal through an amplifier and an analog/digital converter, and providing the digital baseband signal to an MSM (Mobile System Modem), and converting a digital baseband signal received from the MSM into an analog signal and an intermediate frequency signal, converting the IF signal into a desired RF band signal, and providing the RF signal to the base station through the antenna the WILL terminal 100 also has the MSM 12 for decoding the digital baseband signal from the RF transmission/reception part 11 to produce an information data, coding an information data intended to transmit, converting the coded information data into a digital baseband signal, and providing the digital baseband signal to the RF transmission/reception part 11, a CODEC 13 for coding an analog voice signal from the microphone into a digital voice signal, and providing the digital voice signal to the MSM 12, and decoding a digital voice signal from the MSM 12 into an analog voice signal and adjusting levels of respective voice signals, a speaker 14a for presenting the analog voice signal from the CODEC 13, a microphone 14b for providing the analog voice signal to the CODEC 13, a built-in USB 21 in the MSM 12 for making fast communication with an external device, such as an external PC. Alternatively, the USB 21 is may be separated from the MSM 12. The WILL terminal 10 also has a USB line driver 22 in a data interface part 17 for driving a line so that the USB 21 and the external PC make communication through the charger 200 and the communication pin connector 23, a memory 18 for storing a main program for driving the MSM 12, a RF calibration data, and a data related to user services, and a power supplying part 16 having a charge battery for supplying power to respective parts.

Moreover, as explained in association with FIGS. 3 and 4, the external charger 200 has the connectors provided such that the communication pin connector 25 and the USB connector 300 each built in itself for permitting communication between the one piece type WLL terminal 100 and the external PC 400 by the communication pin connectors 23 of the integrated type WLL terminal 100. Moreover, the external terminal 200 is provided to charge the battery of the one piece type WLL terminal 100. In addition, FIG. 5 illustrates a key pad 19 having a send button and a ringer 20 for providing a ring signal.

As shown in FIGS. 3, and 5, battery in the power supplying part 16 and the external charger 200 are connected by two pin types for charging the battery in the WLL terminal 100.

The operation of the WLL terminal 100 of the present invention is activated by pressing the send button for reception, and pressing the send button after pre-dialing or post-dialing in transmission.

As explained, since the USB cable has two data signal lines and two power lines, the charger 200 can have power supplied thereto from the PC, not through a separate adapter, but through the USB cable.

Figure 6:
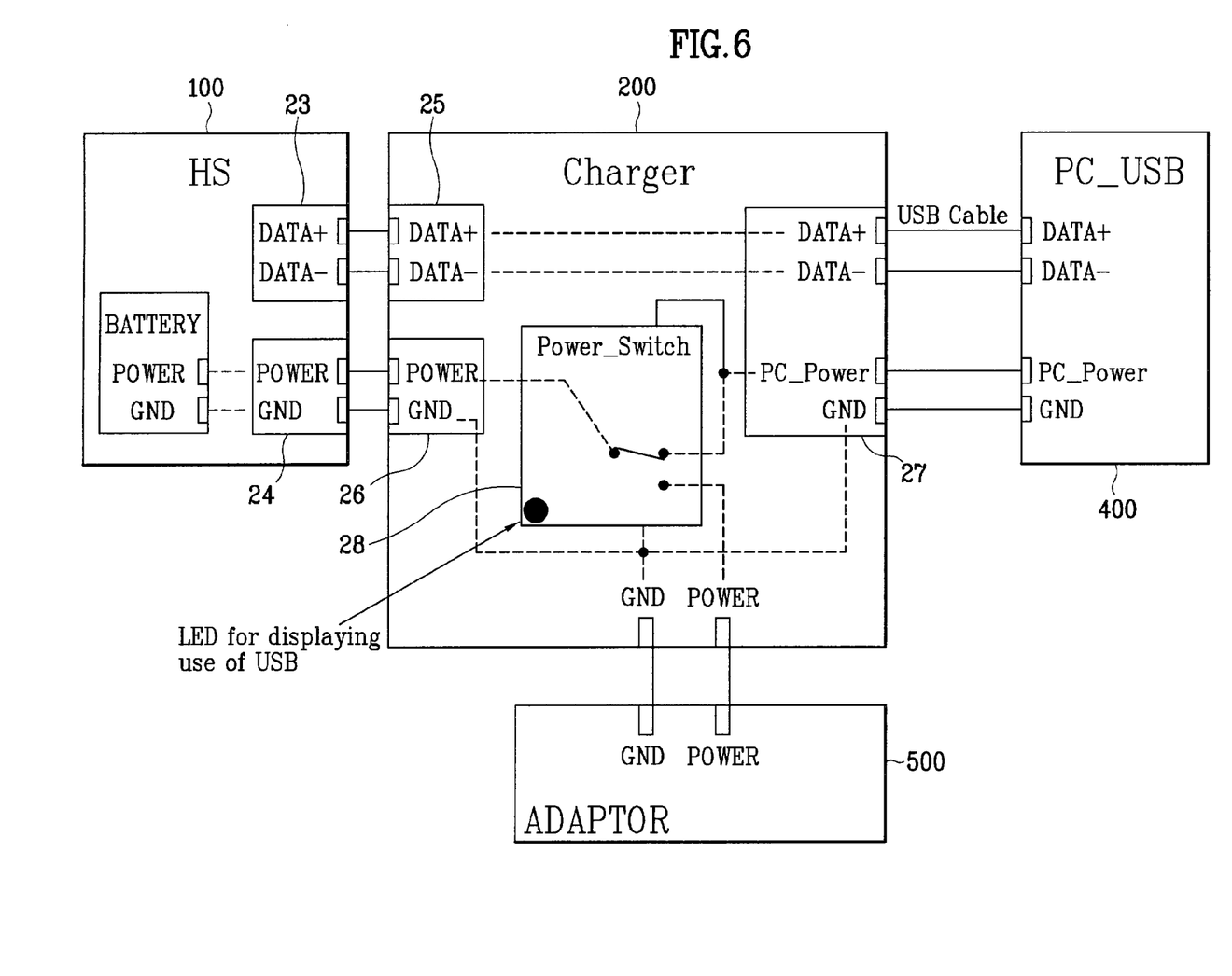
FIG. 6 illustrates a schematic circuit diagram of a charger of the integrated WLL terminal in accordance with a preferred embodiment of the present invention.

FIG. 6 illustrates a circuit of a charger of an integrated type WLL terminal 100 in accordance with a preferred embodiment of the present invention. That is, for permitting the WLL terminal 100 to receive a power from the PC 400 when the charger 200 is connected to the PC 400 by the USB cable, a power switching part or device 28 is further included for sensing connection of the USB cable to the USB connector 27 and supplying power from the PC 200 to the battery in the WLL terminal. Use of the USB is displayed by an LED.

As has been explained, the WLL system of the present invention has the following advantages.

First, the one piece type WLL system having a built in handset with a speaker and a microphone and the power supply in a regular battery power supply type by charging a separate charger through an external charge circuit permits convenient use of the WLL system while carrying the WLL system within a short range like a general wireless telephone.

Second, the fitting of the USB having a fast transmission rate and a small number of pins to the MSM and the connection to the PC with a built in USB permits a fast rate PC communication through the WLL terminal.

Third, because the USB cable can have power supplied therethrough, the WLL terminal can have the power supplied thereto from the PC without any separate adapter.

It will be apparent to those skilled in the art that various modifications and variations can be made in one piece type wireless local loop system of the present invention without departing from the spirit or scope of the invention. Thus, it is intended that the present invention cover the modifications and variations of this invention provided they come within the scope of the appended claims and their equivalents.

What is claimed is:

1. A wireless local loop (WLL) apparatus for communicating with a base station, the apparatus comprising:
 a WLL cellular terminal comprising:
  a modem for coding or decoding a signal communicated over a cellular communication network;
  a universal serial bus (USB) device connected to the modem for communicating with an external device;
  a first communication port to receive data from the external device;
  a USB line driver connected to the USB device to process the information received through the first communication port; and
  a first power connector for receiving power from an external power source; and a detachable charger comprising:
   a second power connector that couples with the first power connector;
   a second communication port that couples with the first communication port;
   a power switching part to sense connection of the external device to provide power from the external device to the second power connector to provide power to the WLL terminal through the first power connector; and
   a display indicating whether the USB device is being used,
  wherein the WLL cellular terminal communicates directly with the base station over a wireless local loop cellular communication network, wherein the wireless local loop cellular communication network comprises a cellular telephony network that supports communication between the wireless local loop cellular base station and the WLL cellular terminal in a local area, without providing a hand-off feature such that the WLL cellular terminal is unable to connect to the wireless local loop cellular communication network when the WLL terminal travels beyond the local designated area covered by the wireless local loop cellular base station,
  wherein the wireless local loop cellular base station is remotely connected to the WLL cellular terminal in a wide area wireless cellular network, so that a line connecting the base station to a PSTN line need not terminate at a local area where the WLL cellular terminal is utilized, and
  wherein the wireless local loop cellular base station is further remotely connected to a plurality of other WLL cellular terminals in the wide area wireless cellular network such that said plurality of WLL cellular terminals are not utilized within the local area where the WLL cellular terminal is utilized.

2. The WLL apparatus of claim 1, wherein the charger includes a USB connector to communicate with the external device.

3. The WLL apparatus of claim 2, wherein the USB connector is connected to the second power connector and the second communication port of the charger.

4. The WLL apparatus of claim 3, wherein at least two communication lines of the USB connector are coupled to the second communication port and at least two power lines of the USB connectors are coupled to the second power connector.

5. The WLL apparatus of claim 1, further comprising:
 an antenna;
 an RF reception part for receiving an RF signal through the antenna, producing an IF (Intermediate Frequency) signal, converting the IF signal into a digital baseband signal, and providing the digital baseband signal to the modem;
 a codec for decoding a modem output into an analog voice signal; and
 a speaker for audibly generating the analog voice signal from the codec.

6. The WLL apparatus of claim 1, wherein the external device is a computer equipped with a USB port.

7. A detachable charger for a wireless local loop (WLL) terminal comprising:
 a second power connector coupled to a first power connector of a WLL terminal for receiving power from an external power source when the WLL terminal is connected to the detachable charger;
 a second communication port coupled to a first communication port of the WLL terminal; and
 a power switching part to sense connection of an external device to provide power from the external device to the second power connector and to provide power to the WLL terminal through the first power connector,
 wherein the WLL terminal communicates directly with a base station over a wireless local loop communication network, wherein the wireless local loop communication network comprises a cellular telephony network that supports communication between the wireless local loop base station and the WLL terminal in a local area, without providing a hand-off feature between one or more base stations such that the WLL terminal is unable to connect to the wireless local loop communication network when the WLL terminal travels beyond the local designated area covered by the wireless local loop base station,
 wherein the base station is remotely connected to the WLL terminal in a wide area wireless cellular network, so that a line connecting the base station to a PSTN line need not terminate at a local area where the WLL terminal is utilized, and
 wherein the wireless local loop cellular base station is further remotely connected to a plurality of other WLL cellular terminals in the wide area wireless cellular network such that said plurality of WLL cellular terminals are not utilized within the local area where the WLL cellular terminal is utilized.

8. The detachable charger of claim 7, wherein the detachable charger comprises a USB connector to communicate with the external device.

9. The detachable charger of claim 8, wherein the USB connector is connected to the second power connector and the second communication port of the charger.

10. The detachable charger of claim 9, wherein at least two communication lines of the USB connector are coupled to the second communication port and at least two power lines of the USB connectors are coupled to the second power connector.

11. The detachable charger of claim 7, further comprising:
 an antenna.

12. The detachable charger of claim 11, further comprising:
 an RF reception part for receiving an RE signal through the antenna, producing an IF (Intermediate Frequency) signal, converting the IF signal into a digital baseband signal, and providing the digital baseband signal to a modem of the WLL terminal.

13. The detachable charger of claim 12, further comprising a codec for decoding the modem output into an analog voice signal.

14. The detachable charger of claim 13, further comprising a speaker for audibly generating the analog voice signal from the codec.

15. The detachable charger of claim 7, wherein the external device is a computer equipped with a USB port.

* * * * *